(12) United States Patent
Chen

(10) Patent No.: US 10,520,796 B2
(45) Date of Patent: Dec. 31, 2019

(54) LIGHT-REFLECTING DEVICE FOR PHOTOGRAPHIC LIGHT

(71) Applicant: Yueqing Originality Photography Equipment Co., Ltd, Yueqing, Province Zhejiang (CN)

(72) Inventor: Qingyuan Chen, Yueqing (CN)

(73) Assignee: Yueqing Originality Photography Equipment Co., Ltd. (CN)

( * ) Notice: Subject to any disclaimer, the term of this patent is extended or adjusted under 35 U.S.C. 154(b) by 167 days.

(21) Appl. No.: 15/668,084

(22) Filed: Aug. 3, 2017

(65) Prior Publication Data
US 2018/0039164 A1 Feb. 8, 2018

(30) Foreign Application Priority Data

Aug. 4, 2016 (CN) ............... 2016 2 0846483 U
Aug. 1, 2017 (CN) ............... 2017 2 0951515 U

(51) Int. Cl.
| | |
|---|---|
| *G03B 15/06* | (2006.01) |
| *G03B 17/56* | (2006.01) |
| *G03B 15/03* | (2006.01) |
| *F21V 7/09* | (2006.01) |
| *F21V 7/00* | (2006.01) |
| *F21V 7/18* | (2006.01) |

(52) U.S. Cl.
CPC ............ *G03B 17/565* (2013.01); *F21V 7/005* (2013.01); *F21V 7/0025* (2013.01); *F21V 7/09* (2013.01); *F21V 7/18* (2013.01); *G03B 15/03* (2013.01); *G03B 15/06* (2013.01); *G03B 17/566* (2013.01); *G03B 2215/0528* (2013.01)

(58) Field of Classification Search
CPC .. F21V 7/18; F21V 1/06; G03B 15/06; G03B 15/02
USPC .......................................................... 396/200
See application file for complete search history.

(56) References Cited

U.S. PATENT DOCUMENTS

| | | | |
|---|---|---|---|
| 2008/0137352 A1* | 6/2008 | O'Brien ............... | F21V 7/18 362/365 |
| 2014/0192510 A1* | 7/2014 | Kim .................. | G03B 15/02 362/16 |

* cited by examiner

*Primary Examiner* — Clayton E. LaBalle
*Assistant Examiner* — Fang-Chi Chang
(74) *Attorney, Agent, or Firm* — PROI Intellectual Property US

(57) ABSTRACT

The present invention provides a light-reflecting device for a photographic light, comprising a positioning member which is engageable with a support member, a top end of the support member being provided with a jacket; wherein the positioning member is provided with a locking mechanism of the jacket, the locking mechanism being provided with a movable lock button, the lock button being movably connected to the jacket. The present invention has the following beneficial effects: compact integral structure, convenient disassembling operation, and long life time.

10 Claims, 16 Drawing Sheets

LIGHT-REFLECTING DEVICE FOR PHOTOGRAPHIC LIGHT

CROSS REFERENCE TO RELATED APPLICATIONS

The present application claims priority to Chinese Patent Application CN 201620846483.1 filed on Aug. 4, 2016 and to Chinese Patent Application CN 201720951515.9 filed on Aug. 1, 2017.

TECHNICAL FIELD

The present invention relates to the field of photographing devices, and in particular, relates to a light-reflecting device for a photographic light.

BACKGROUND

To make the light softer, photographers generally additionally arrange a soft-light box in front of a photographic light, and assembling and disassembling of the conventional soft-light box take long and are inconvenient. Chinese patent application CN203757314 has disclosed a rapidly-installed soft-light box support, wherein a plurality of support rod connectors are formed in a support positioning member, elastic support rods are arranged on the support rod connectors, limiting plates are arranged above the support rod connectors, and support rod locking devices are arranged on the support rod connectors. The collapse and opening of the elastic support rods are controlled by sliding of a reset member on the side face. However, in practical application, the soft-light support may be easily damaged and thus the life time thereof is short.

SUMMARY

To overcome the defect in the prior art, the present invention provides a light-reflecting device for a photographic light, which is compact in structure, is subjected to uniform stress, and has a long life time.

To solve the technical problem, the present invention employs a technical solution of a light-reflecting device for a photographic light, comprising a positioning member which is engageable with a support member, a top end of the support member being provided with a jacket; wherein the positioning member is provided with a locking mechanism of the jacket, the locking mechanism being provided with a movable lock button, the lock button being movably connected to the jacket.

Further, the locking mechanism comprises the lock button, a toggle for controlling forward and backward movements of the lock button is provided at an upper end of the lock button, a rib movably connected to the jacket is provided on one side at a lower end of the lock button, and a reset member is provided on the other side at the lower end of the lock button.

Further, the locking mechanism is arranged in a square groove, a positioning mechanism is arranged on one side of the rib, the height of the rib is higher than the jacket, and the rib and the jacket form an up-down staggered structure or mutually-nested structure.

Further, the rib is a hollow tube structure or a hollow square structure or a hollow bar structure.

Further, the jacket comprises a jacket body allowing the support member to insert and a rotary shaft arranged passing through the jacket body; an end part of the jacket body is provided with a first bevel face.

Further, one side face of the rib movably connected to the jacket is provided with a second bevel face having an arch shape, the second bevel face structure in reverse to the first bevel face structure in terms of bevel direction, and, when the jacket rotates to be propped up, the first bevel face presses against the second bevel face constantly to push the lock button to move inwards.

Further, the locking mechanism comprises a lock button, a rotating shaft used for moveably connecting the lock button to the positioning member, and an elastic element, the elastic element being arranged on the rotating shaft, one end of the elastic element abutting against the positioning member while the other end abutting against the lock button, and a hook part having an arch shape structure being formed on the lock button.

Further, a limiting groove is formed on the positioning member, the jacket comprises a second jacket body allowing the support member to insert and a second rotary shaft arranged crossing the second jacket body, and, when the second jacket body rotates to be propped up, the lock button turns over around the rotary shaft under the action of the restoring force of the elastic element, the hook part can limit the second jacket body penetrating out from one side of the limiting groove.

Further, the elastic element is a torsional spring.

Further, the positioning member is provided with a cover body, both the positioning member and the cover body are of hollow structure.

Further, annular hollows of the positioning member and the cover body are each provided with a flashlight.

Further, a reflecting cloth is arranged between two neighboring support members.

Further, an annular hollow of the positioning member is provided with a diffusing step groove, Such that a radiation range of a light source is larger.

The present invention has the following beneficial effects: compact integral structure, convenient disassembling operation, and long life time.

DETAILED DESCRIPTION

Figure 1:
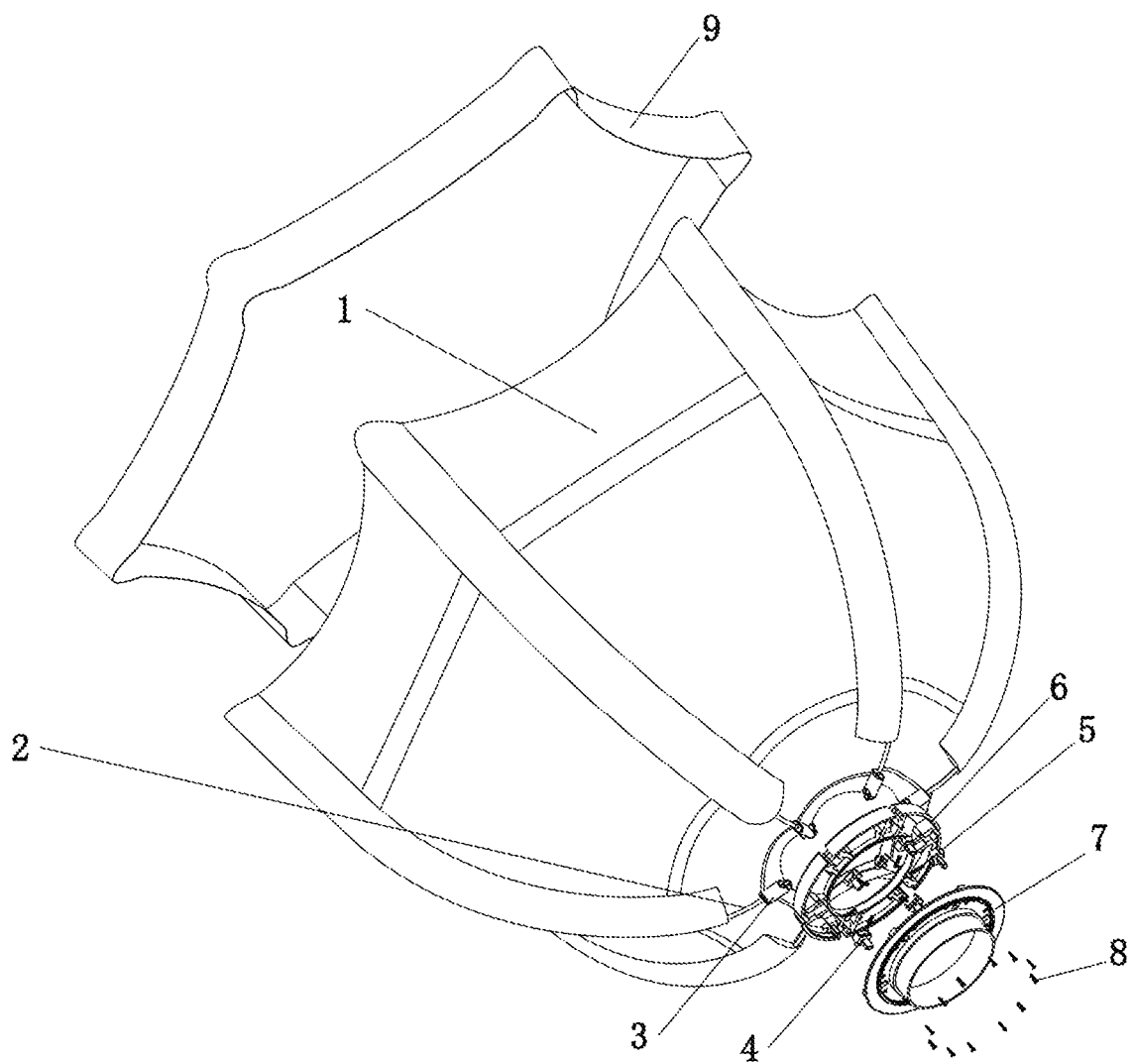
FIG. 1 is a schematic exploded view illustrating a light-reflecting device for a photographic light according to the present invention.
Figure 2:
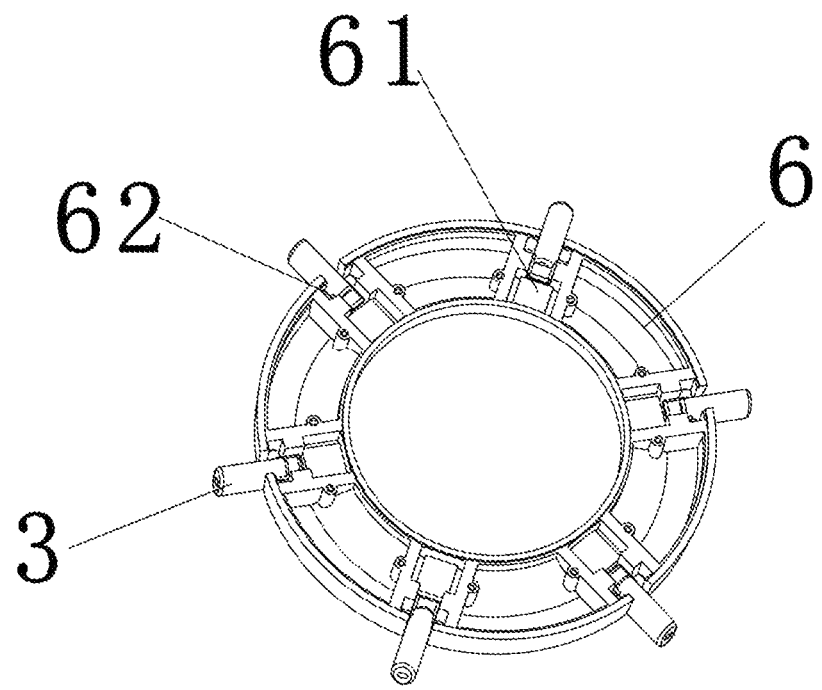
FIG. 2 is a schematic structural view illustrating a jacket which is arranged in a positioning member.
Figure 3:
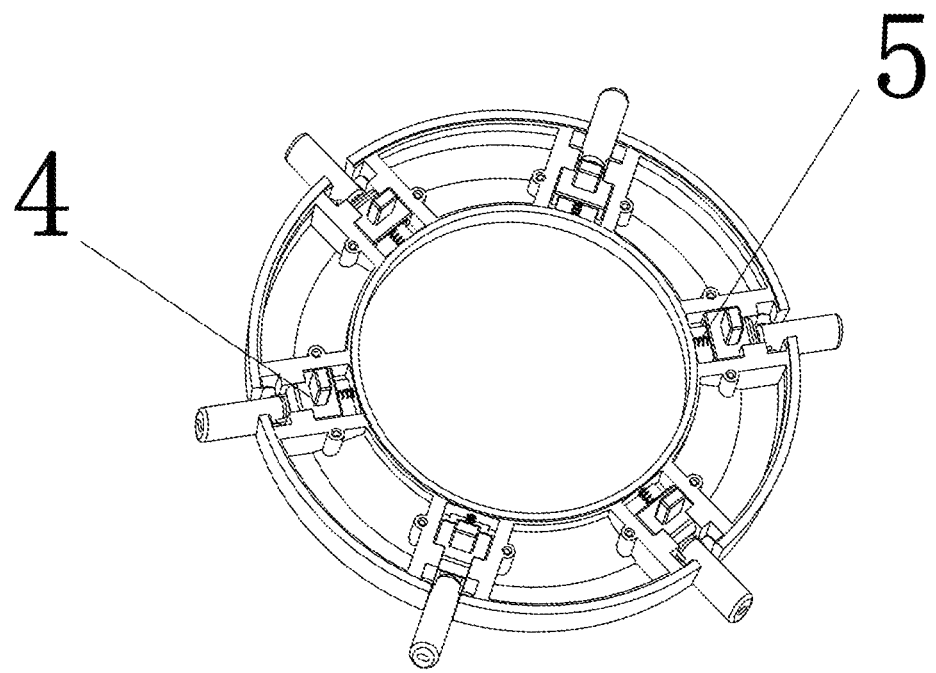
FIG. 3 is a schematic structural view illustrating a lock button, a jacket and a positioning member.
Figure 4:
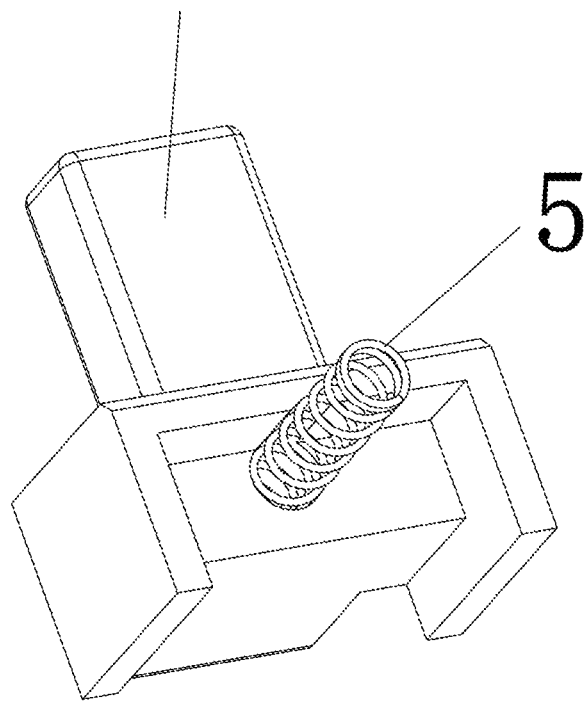
FIG. 4 is a schematic structural view illustrating engagement of a lock button and a reset member.
Figure 5:
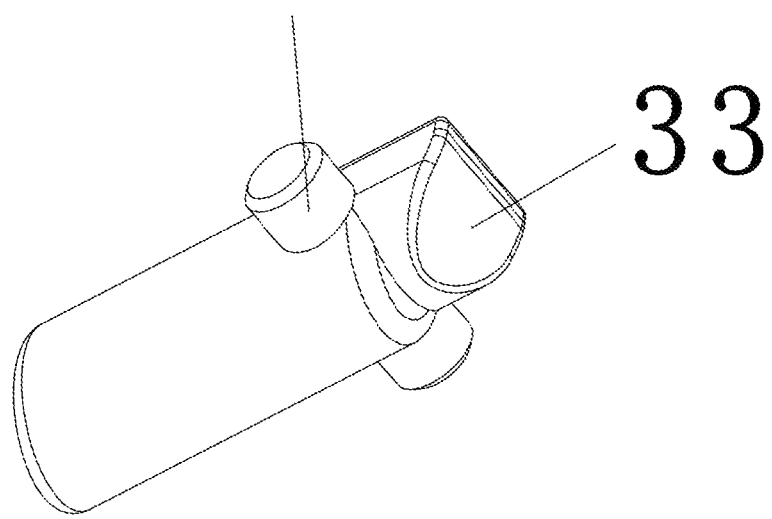
FIG. 5 is one schematic enlarged structural view illustrating the jacket.
Figure 6:
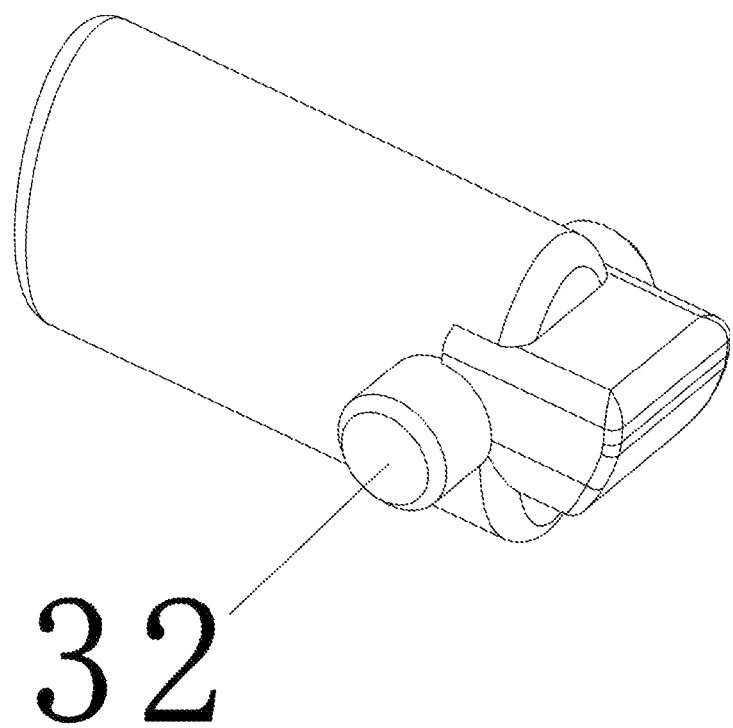
FIG. 6 is another schematic enlarged structural view illustrating the jacket.
Figure 7:
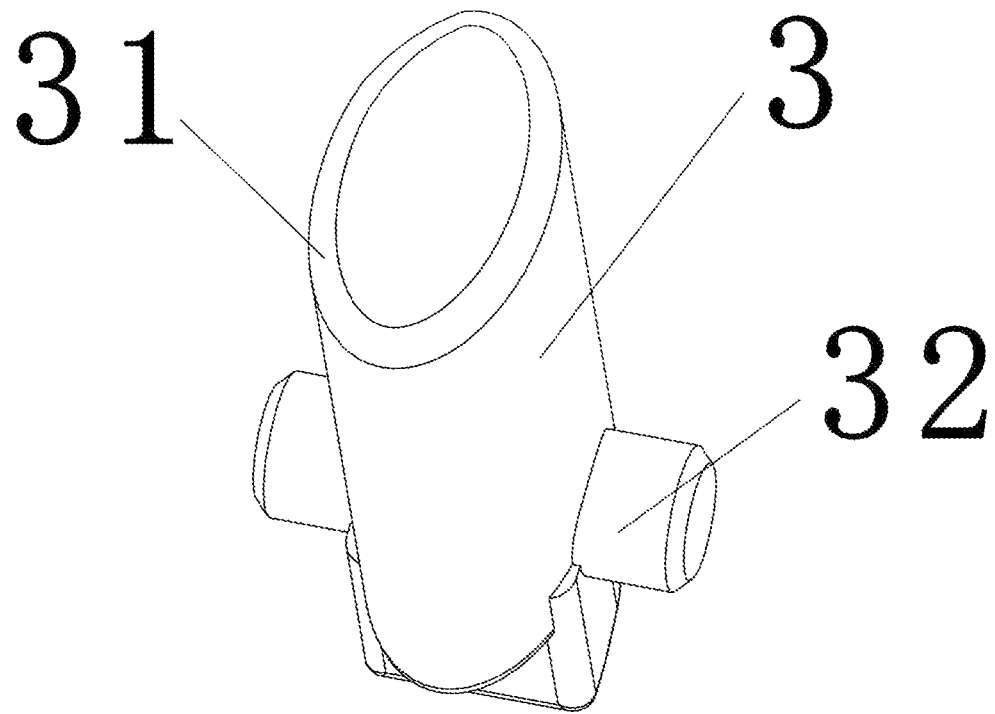
FIG. 7 is still another schematic enlarged structural view illustrating the jacket.
Figure 8:
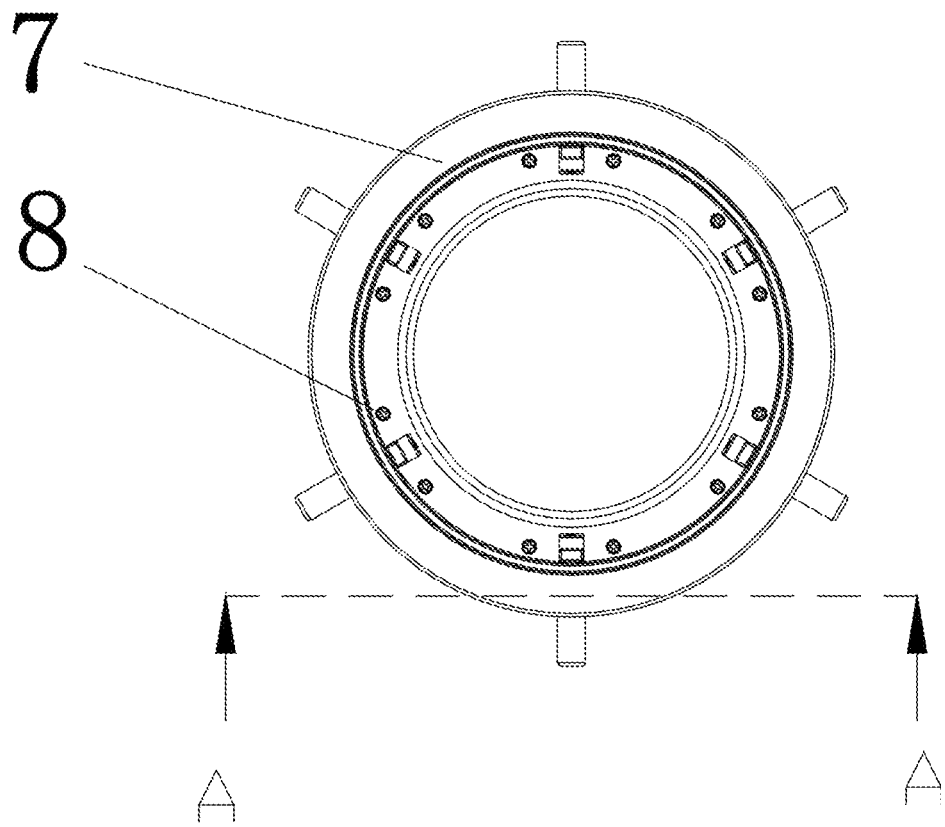
FIG. 8 is one schematic structural view illustrating a cover body.
Figure 9:
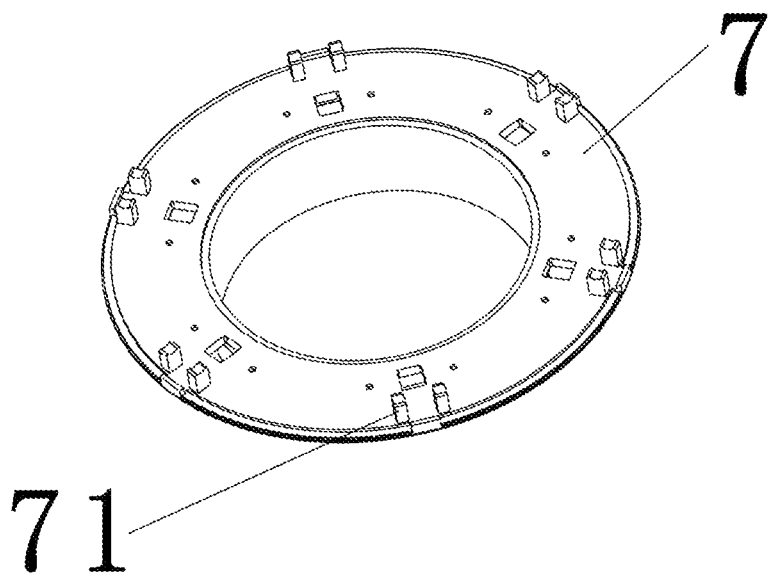
FIG. 9 is another schematic structural view illustrating the cover body.
Figure 10:
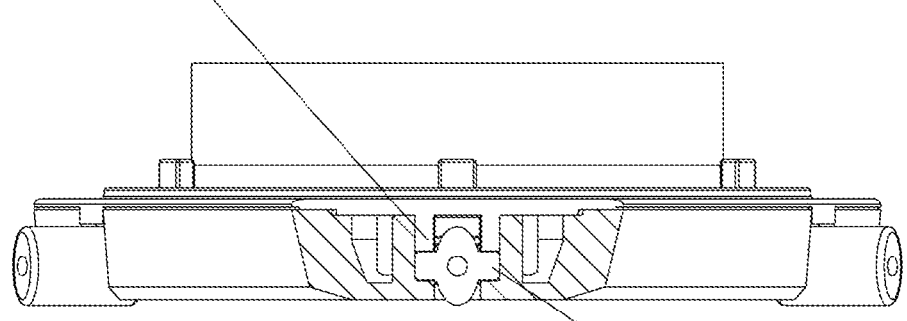
FIG. 10 is an A-A sectional view of FIG. 8.
Figure 11:
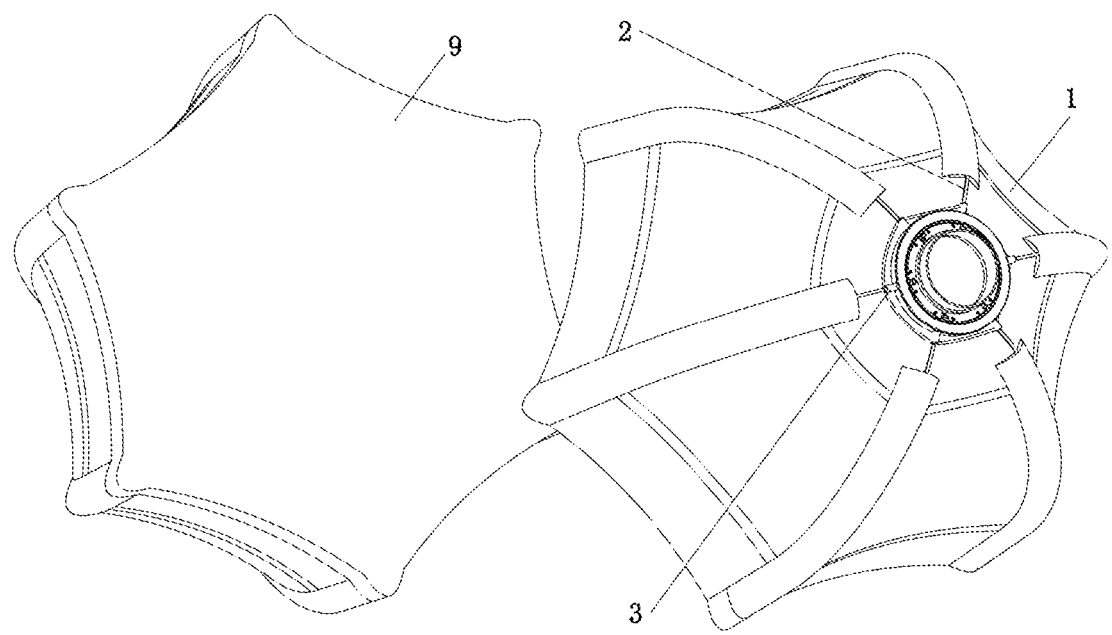
FIG. 11 is a schematic structural view illustrating the light-reflecting device for a photographic light according to the present invention.

To make a person skilled in the art better understand the technical solutions of embodiments of the present invention, the technical solutions of the present invention are clearly and completely described with reference to the accompanying drawings of the embodiments of the present invention. Apparently, the described embodiments are only a part of embodiments of the present invention, rather than the entire embodiments. Based on the embodiments of the present invention, all other embodiments derived by persons of ordinary skill in the art without any creative efforts shall fall within the protection scope of the present invention.

Embodiment 1

Referring to FIG. 1 to FIG. 11, a light-reflecting device for a photographic light comprises a support member 2, a light-reflecting cloth 1 and a soft cloth 9. A jacket 3 is arranged on a top end of the support member 2. The jacket 3 comprises a jacket body 3 having a hollow columnar structure, and a rotary shaft 32 penetrating through the jacket body 31 and having a cylindrical structure. The jacket 3 and the rotary shaft 32 are cross-arranged. The rotary shaft 32 is arranged at an end of the jacket body 31 which is proximate to the center, and a first bevel face is arranged on the end of the jacket body which is proximate to the center. When the jacket 3 is placed into a positioning member 6, the arched surface of the first bevel face structure 33 faces downward, and the planar face of the first bevel face structure 33 faces upward. That is, the arched face is proximate to the positioning member 6, and the planar face is proximate to the cover body 7. The top end of the support member 2 may be inserted into the hollow portion of the jacket body 31. The jacket 3 and the rotary shaft 32 are made into an integral structure, such that the stress thereof is more dispersed and uniform, the structure thereof is compact, and the life time is prolonged.

An annular positioning member 6 is arranged on the top end of the support member 2. A plurality of square grooves 61 are circumferentially arranged on the periphery of the positioning member 6. Each square groove 61 is provided with a locking mechanism for controlling movement of the jacket 3. The locking mechanism is provided with a lock button 4. The lock button 4 may be radially movable along the positioning member 6 in the square grooves 61, and the lock button 4 is movably connected to the jacket 3. The lock button 4 comprises a toggle 41 for controlling forward and backward movements of the lock button 4 arranged on the top end thereof, and a rib 42 arranged on a lower end thereof. The rib 42 is movably connected to one end of the jacket 3. Specifically, the rib 42 may be a hollow tube structure or a square structure or a bar structure. The side face of the rib 42 which is movably connected to the jacket 3 is a second bevel face structure 421 having an arch shape, and the second bevel face structure 421 in reverse to the first bevel face structure 33 in terms of bevel direction, that is, the arched face of the second bevel face structure 421 faces downward. A reset member 5 is arranged on one side at the lower end of the lock button 4 which is opposite to the rib 42. In this embodiment, the reset member 5 is a spring. The height of the rib 42 on the positioning member 6 is higher than the height of the jacket 3. Therefore, the rib 42 and the jacket 3 form an up-down staggered structure or a mutually-nested structure.

During assembly, the support member 2 is inserted into the jacket 3, and the jacket 3 is placed into a retaining groove on the positioning member 6 corresponding to the square groove 61. The rotary shafts 32 on both sides are respectively retained on the positioning member 6, then the reset member 5 is placed into a round aperture of the rib 42, and the lock button 4 is mounted in the square groove 61. When all the lock buttons and jackets are assembled, a cover body 7 is mounted on the positioning member 6, and is fixedly connected via a screw 8. The cover body 7 is equivalent to a reinforcing rib of the positioning member 6, which enhances the strength of the positioning member 6. A flashlight may be arranged in annular hollows of the positioning member 6 and the cover body 7. A back face of the cover body 7 is provided with a plurality of groups of fixing columns 71, and the rotary shaft 32 is defined between the fixing columns 71 in one group. In this way, when the jacket 3 rotates, the rotary shaft 32 may move only between the retaining groove 62 and the fixing columns, which ensures concentricity of the jackets 3 during rotation. The light-reflecting cloth 1 is connected and arranged between two neighboring support members 2 to form a hood, and then the soft cloth 9 is arranged on one side of the support 2 opposite to the positioning member 6, thereby completing assembling of the light-reflecting device for a photographic light.

Figure 12:
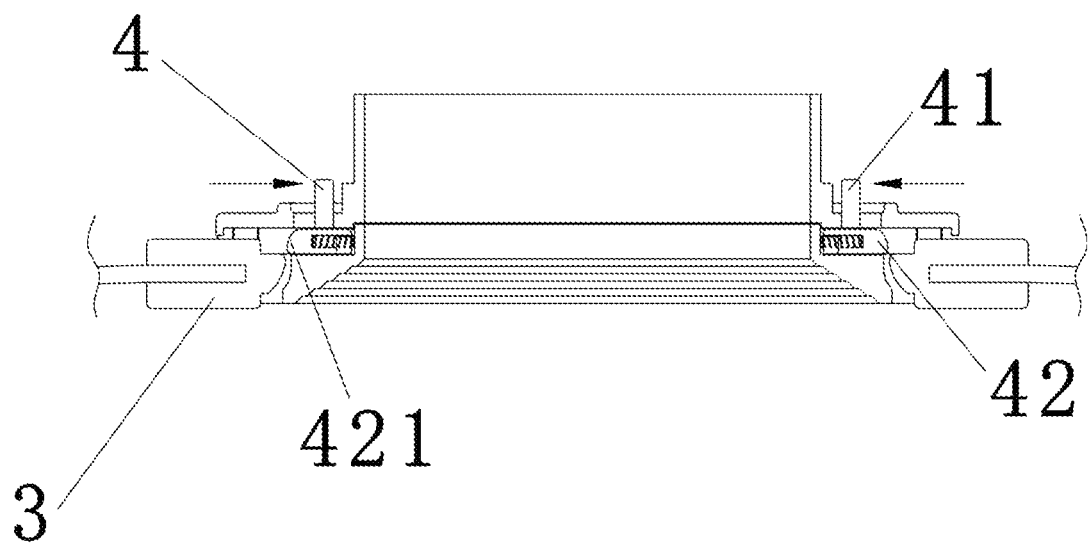
FIG. 12 is one schematic structural view illustrating engagement of the jacket and the lock button when the light-reflecting device for a photographic light according to the present invention is collapsed.
Figure 13:
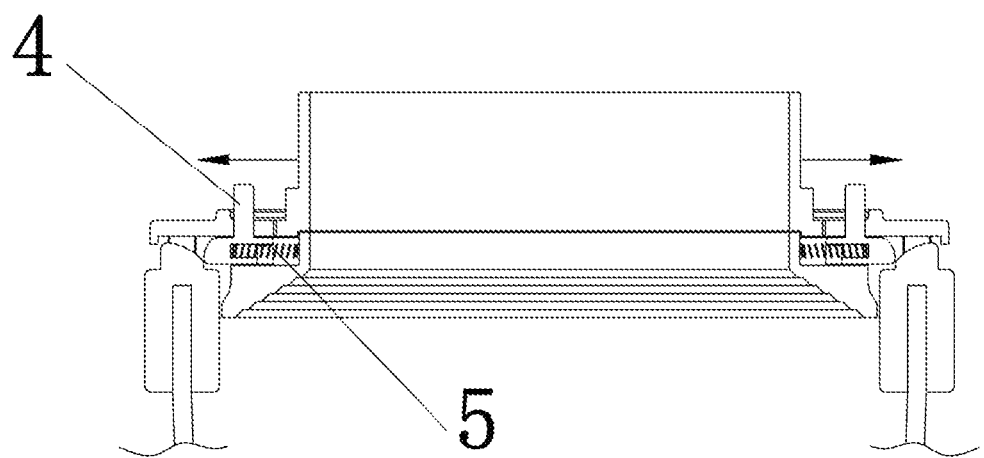
FIG. 13 is another schematic structural view illustrating engagement of the jacket and the lock button when the light-reflecting device for a photographic light according to the present invention is collapsed.

Referring to FIG. 12 and FIG. 13, in an initial state, the rib 42 of the lock button 4 abuts against an end face of the jacket 3. Due to the resilient force of the reset member 5, the lock button 4 outwardly presses against the jacket 3, and the hood is in an open state. When the hood needs to be collapsed, the soft cloth 9 is removed, the lock button is pushed to the middle position by using a toggle 41, and the jacket 3 is no longer subjected to the pressure of the lock button 4 and naturally falls with the rotary shafts 32 on both sides as rotation fulcrums under the effect of gravity, thereby implementing collapse of the hood. The lock button 4 is pushed back to the original position thereof under the effect of restoring force of the reset member 5.

Figure 14:
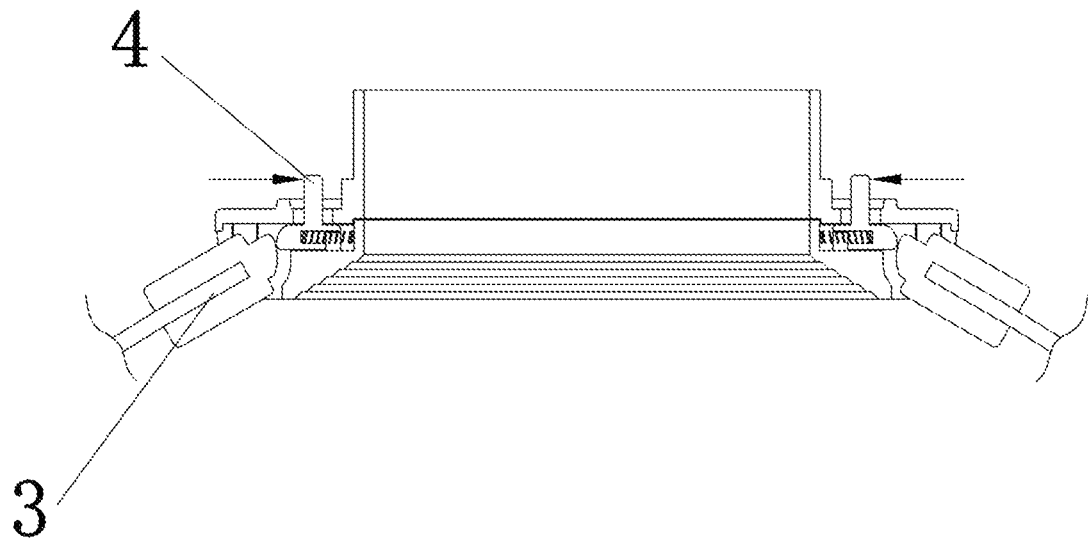
FIG. 14 is one schematic structural view illustrating engagement of the jacket and the lock button when the light-reflecting device for a photographic light according to the present invention is opened.
Figure 15:
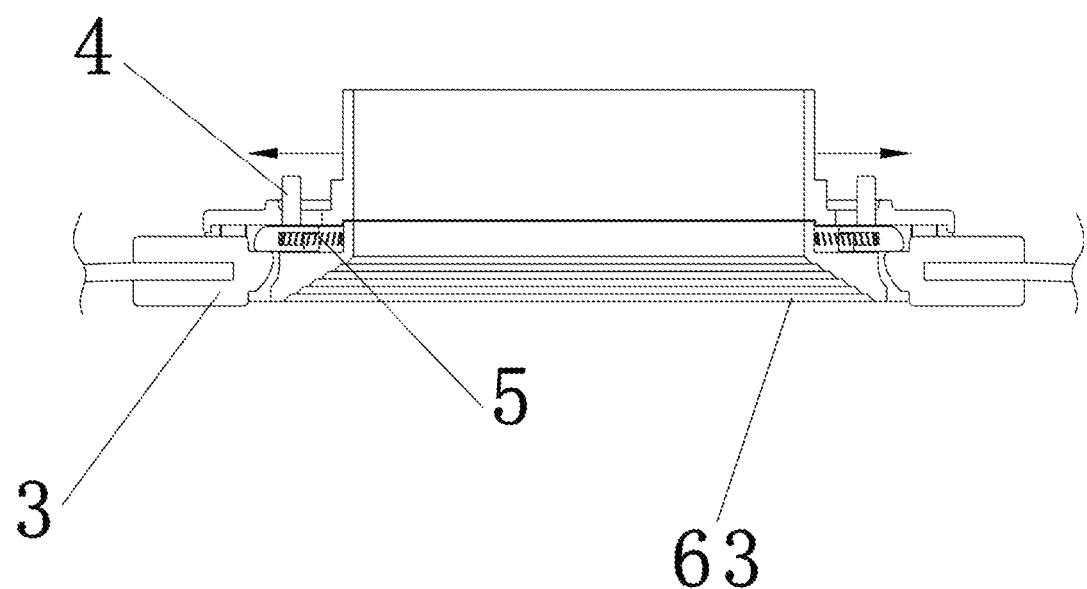
FIG. 15 is another schematic structural view illustrating engagement of the jacket and the lock button when the light-reflecting device for a photographic light according to the present invention is opened.
Figure 16:
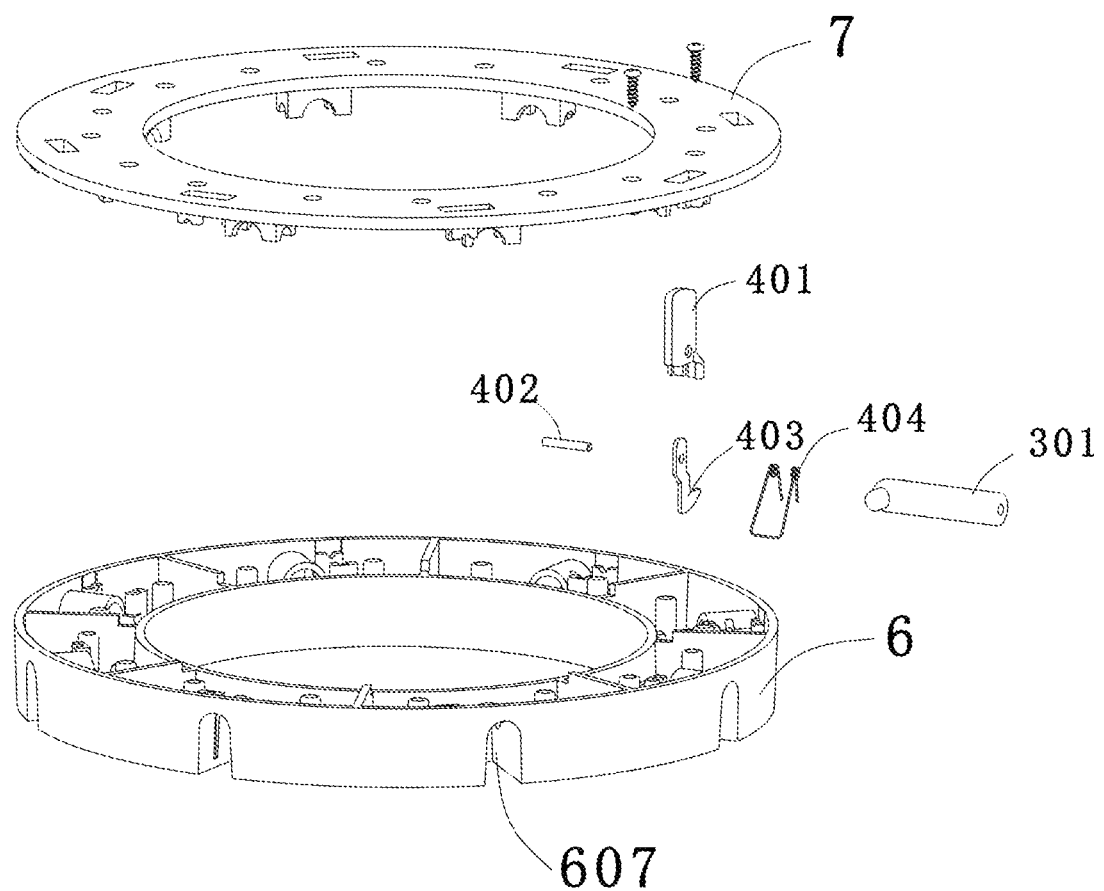
FIG. 16 is a schematic partial exploded view illustrating a light-reflecting device for a photographic light according to an Embodiment 2 of the present invention.
Figure 17:
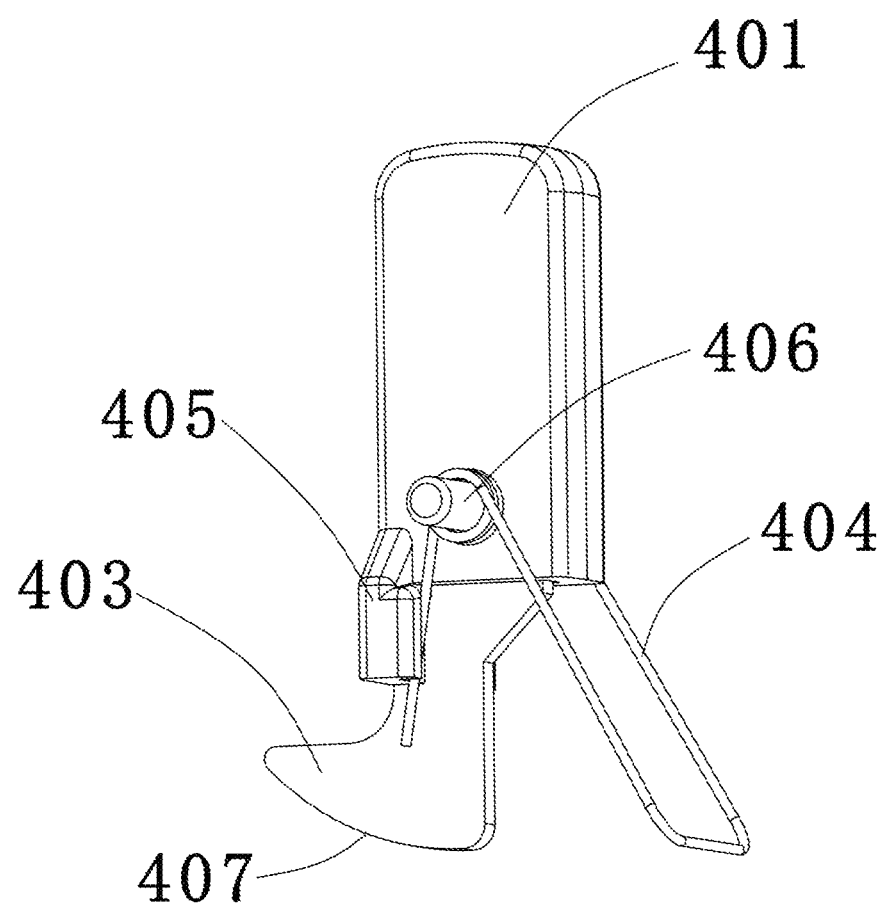
FIG. 17 is a schematic structural view illustrating a locking mechanism according to the Embodiment 2 of the present invention.
Figure 18:
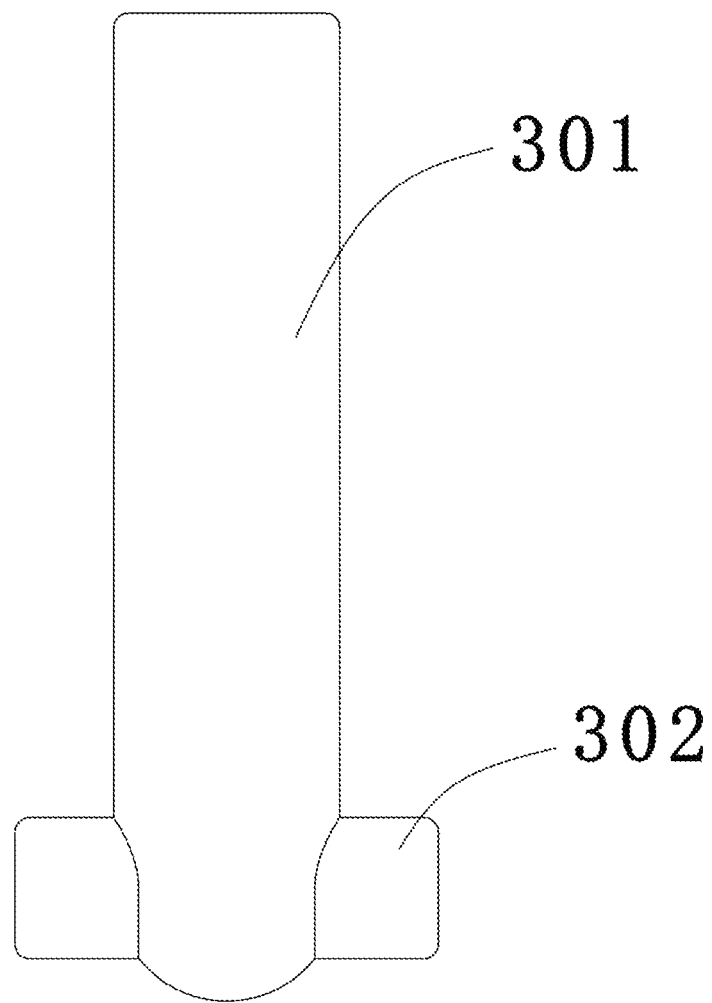
FIG. 18 is a schematic structural view illustrating a jacket according to the embodiment 2 of the present invention.
Figure 19:
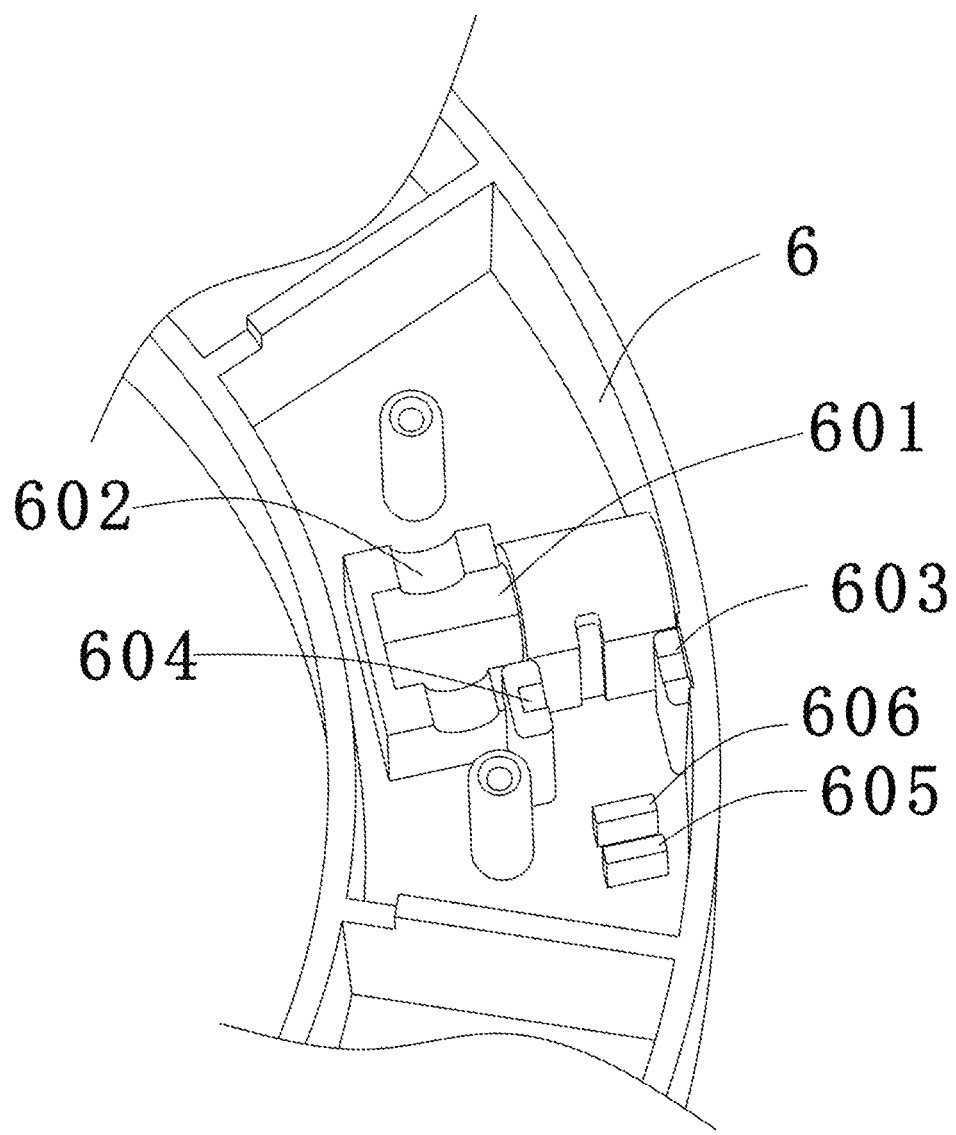
FIG. 19 is a schematic partial structural view illustrating a positing member according to the Embodiment 2 of the present invention.
Figure 20:
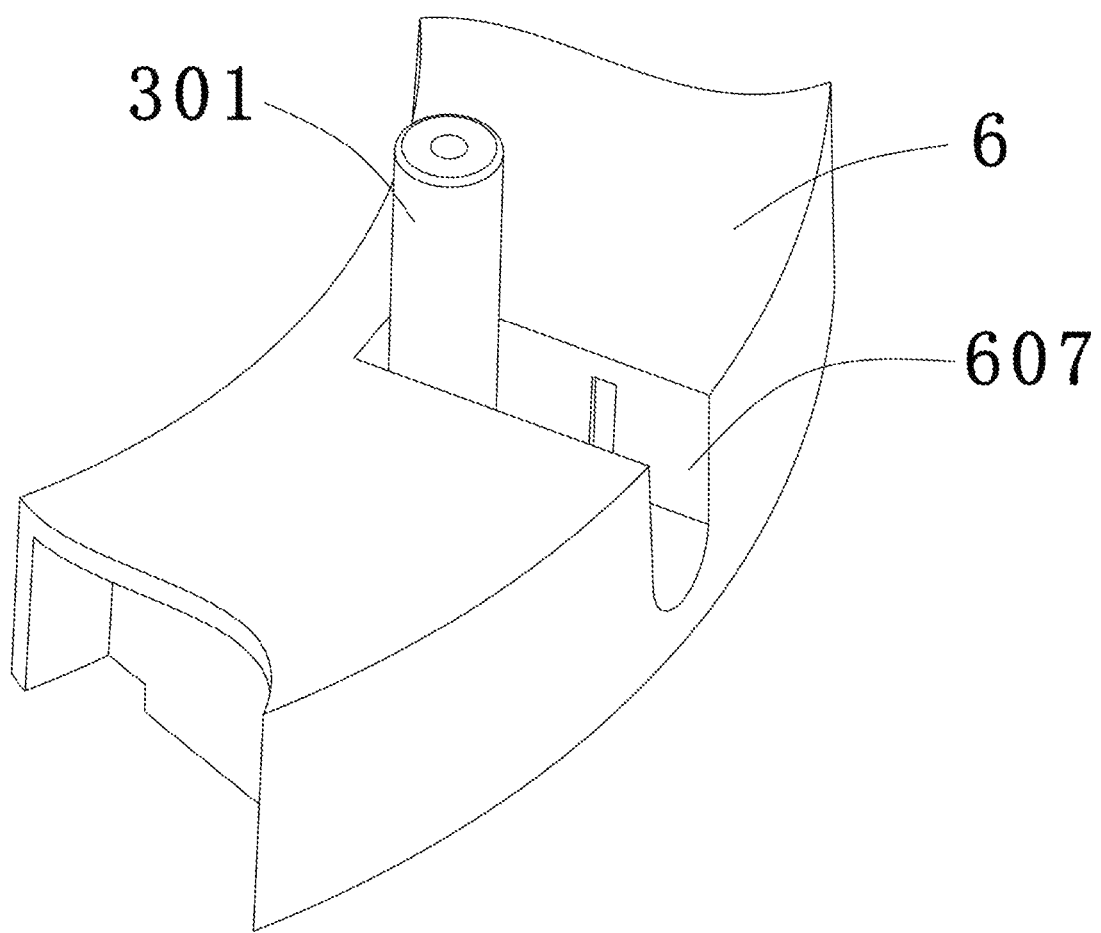
FIG. 20 is a schematic partial structural view illustrating the back surface of the positing member according to the Embodiment 2 of the present invention.
Figure 21:
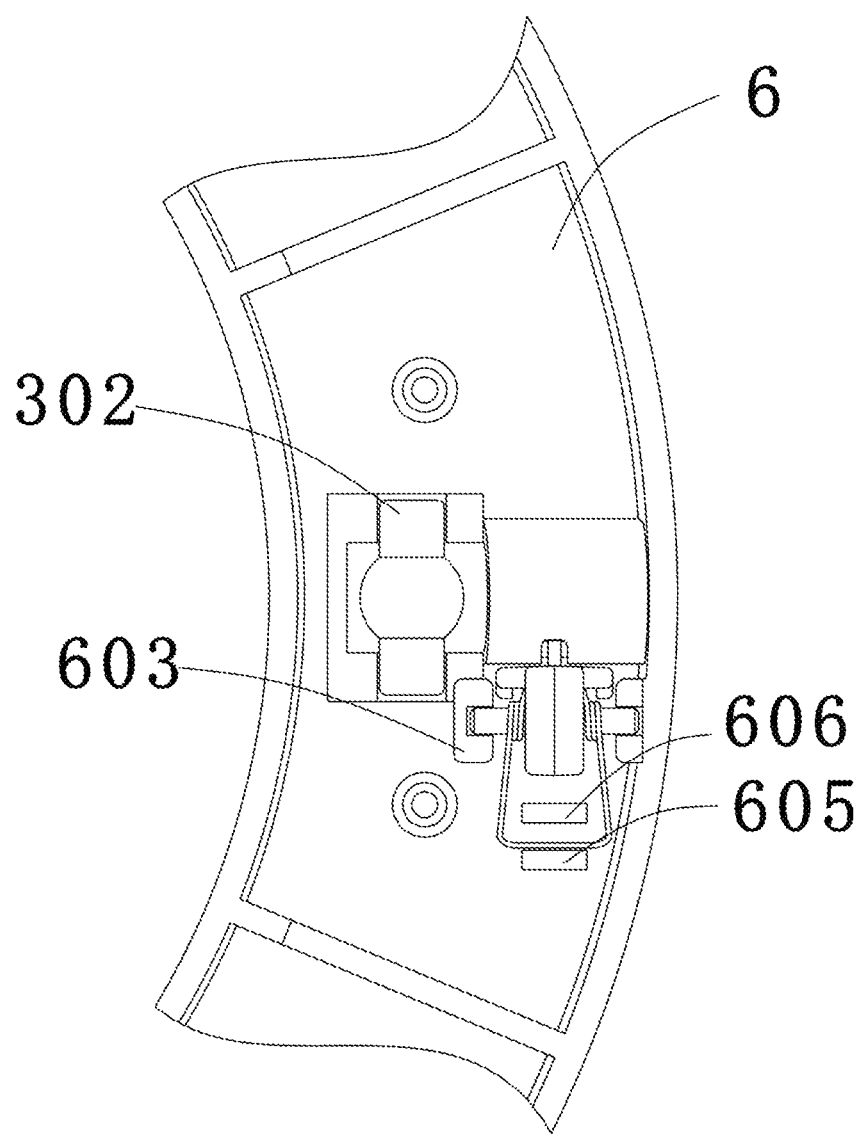
FIG. 21 is a schematic partial structural view illustrating a positioning member assembled with a locking mechanism according to the Embodiment 2 of the present invention.
Figure 22:
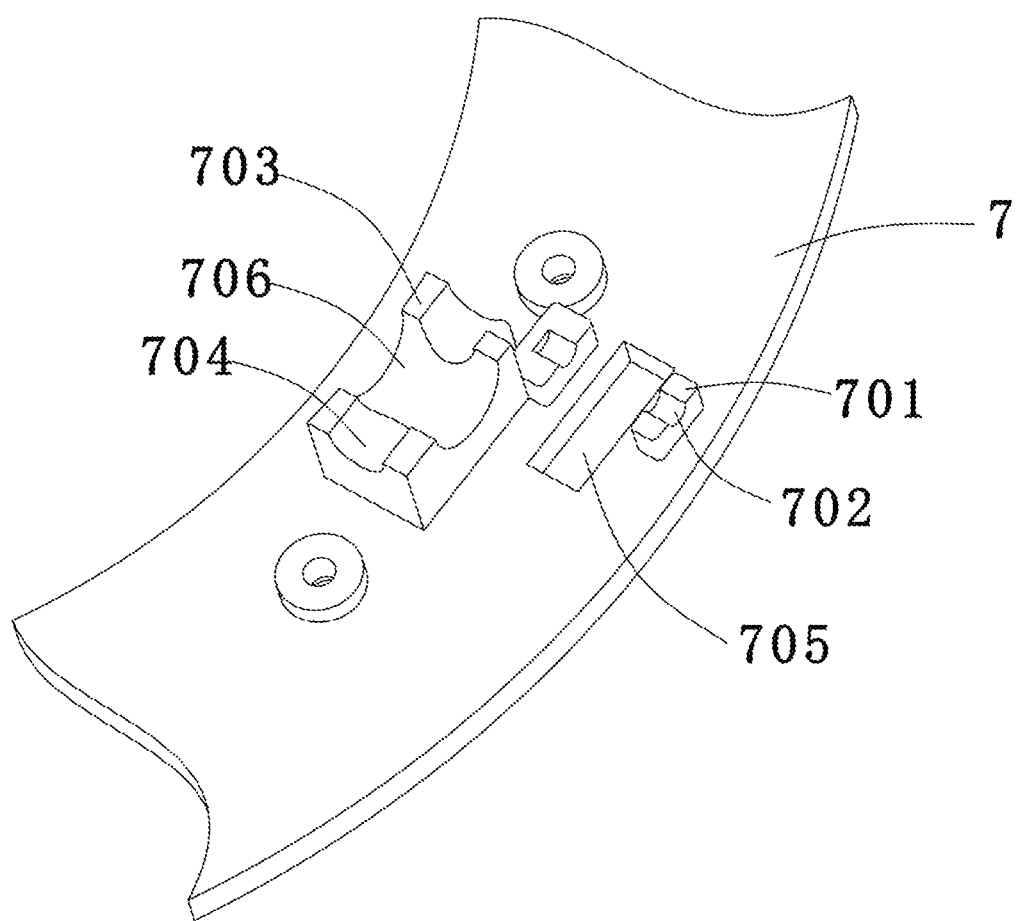
FIG. 22 is a schematic partial structural view illustrating the back face of the cover body according to the present invention.

Referring to FIG. 14 and FIG. 15, the hood is opened, when the jacket is in rotation, the first bevel face structure 33 of the jacket 3 constantly presses against the second bevel face structure 42 at the front end of the lock button 4, and the lock button 4 smoothly moves towards the middle under the pressure of the jacket 3. When the hood is completely opened, the lock button 4 moves again outward to the original position thereof under the effect of pressure from the reset member 5, and deadly presses the jacket 3, such that the jacket 3 is no longer subjected to gravity and thus collapses. The operations in the whole process are simple and efficient.

Diffuser step grooves 63 are arranged in the vicinity of the circle center of the positioning member 6, such that the light-reflecting device is used under cooperation of the flashlight, the irradiation range of the light source may be even greater.

Embodiment 2

Referring to FIG. 16 to FIG. 22, the locking mechanism comprises a lock button 401 protruded out of the upper surface of the cover body 7, a rotating shaft 402 used for erecting the lock button 401 on the positioning member 6, and an elastic element 404 sleeved on the rotating shaft 40. The elastic element 404 is a torsional spring in this embodiment, one end of the torsional spring abuts against a stop part 605 arranged on the positioning member 6 while the other end abuts against a stop block 405 on the lock button 401. In order to guarantee the stability of the torsional spring, a second stop part 606 is formed just opposite the stop part 605, such that one end of the torsional spring is located in the space between the stop part 605 and the second stop part 606. A hook part 403 having an arch shape structure 407 is formed on the end part of the lock button 401, the arch shape structure 407 may guarantee that the lock button 401 rotates around the rotating shaft 402 without interfering with the positioning member 6. In this embodiment, the upper portion of the hook part 403 extends to be inserted into the lock button 401, and the rotating shaft 402 is arranged passing through the hook part 403 and the lock button 401.

Two rotating shaft supporting bases 603 which are arranged in parallel are formed on the positioning member 6, a rotating shaft supporting surface 604 used for clamping the rotating shaft 402 is formed on the top surface of the rotating shaft supporting base 603, the rotating shaft supporting surface 604 is of half slot structure, correspondingly, two rotating shaft supporting bases 701 which are arranged in parallel are formed on a cover body 7, a rotating shaft supporting surface 702 used for clamping the rotating shaft 402 is formed on the top surface of the rotating shaft supporting base 701, the rotating shaft supporting surface 702 is of half slot structure. When the positioning member 6 and the cover body 7 are fit together, the rotating shaft 402 is firmly clamped between the two supporting surfaces. An open groove 705 allowing the lock button 401 to partially protrude out is arranged between the two rotating shaft supporting bases 701 on the cover body 7, and the lock button 401 can move left and right in the open groove 705.

The jacket 3 comprises a second jacket body 301 having a hollow columnar structure, and a second rotary shaft 302 penetrating through second jacket body 301 and having a cylindrical structure. The second jacket body 301 and the second rotary shaft 302 are cross-arranged, and the second jacket body 301 and the second rotary shaft 302 are of integrated structure. A plurality of U shaped limiting groove 607 are circumferentially arranged on the periphery of the positioning member 6 evenly, the opening of the limiting groove 607 is opened far away from the direction of the cover body 7, a jacket locking mechanism for controlling movement of the jacket 3 is provided in the vicinity of each limiting groove 607, and the second jacket body 301 penetrates out from one side of the limiting groove 607 to be engageable with the hook part 403.

Two rotary shaft supporting bases 601 which are arranged in parallel are formed on the positioning member 6, a space used for accommodating the second jacket body 301 is formed between the two rotary shaft supporting bases 601, one side of the limiting groove 607 is integrally connected with the rotary shaft supporting base 601, a rotary shaft supporting surface 602 used for clamping the second rotary shaft 302 is formed on the top surface of the rotary shaft supporting base 601, the rotary shaft supporting surface 602 is of half slot structure, correspondingly, a rotary shaft supporting base 703 is also formed on the cover body 7, two rotary shaft supporting surfaces 704 used for clamping the second rotary shaft 302 are formed on the top surface of the rotary shaft supporting base 703, the rotary shaft supporting surface 704 is of half slot structure, and a concave surface 706 fitting with the outer wall of the second jacket body 301 is further formed between the two rotary shaft supporting surfaces 70. When the positioning member 6 and the cover body 7 are fit together, the second rotary shaft 302 and the second jacket body 301 are firmly clamped between the supporting surface and the concave surface.

Figure 23:
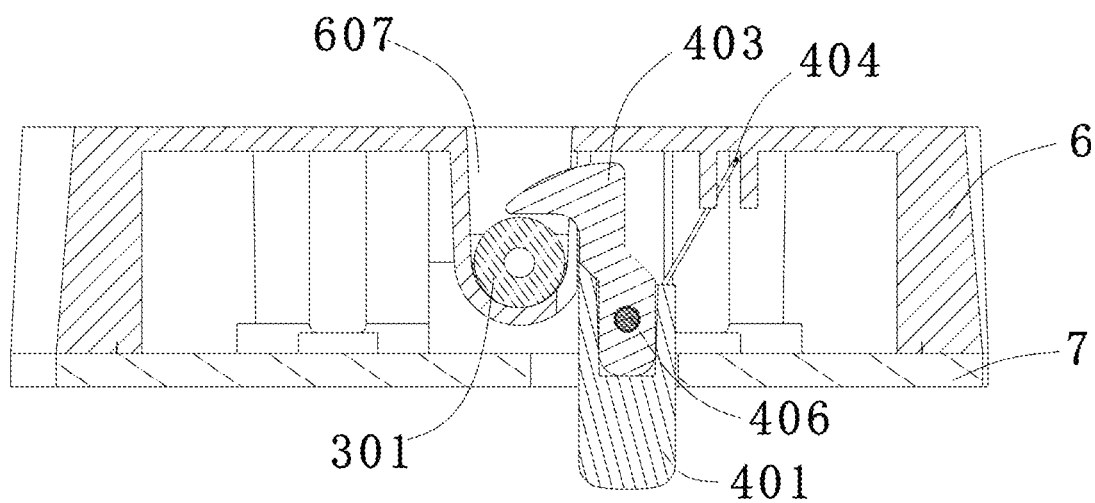
FIG. 23 is a sectional schematic structural view illustrating the locking mechanism which limits the jacket.
Figure 24:
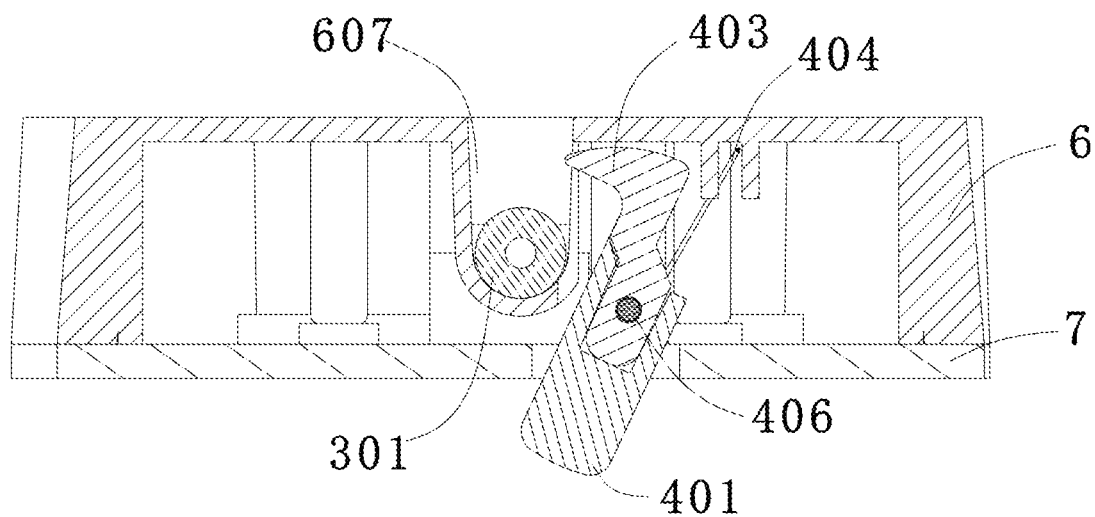
FIG. 24 is a sectional schematic structural view illustrating the locking mechanism which unlocks the jacket.

Referring to FIG. 24, toggle the lock button 401, the lock button 401 rotates around the rotating shaft 406 clockwise, so that the hook part 403 is not directly facing the opening end of the limiting groove 607 and that the second jacket body 301 successfully rotates into the limiting groove 607. Referring to FIG. 23, after the hood is propped up, exerting external force is stopped, the lock button 401 rotates anticlockwise under the action of the torsional spring 404, and the hook part 403 firmly limits the second jacket body 301 inside the limiting groove 607.

Other structures of this embodiment are similar to Embodiment 1, and no further description is needed here.

The above specific embodiments are used to interpret or illustrate the present invention, instead of limiting the present invention. Any modification and variation made to the present invention based on the spirit of the present invention and the protection scope of the claims shall fall within the protection scope of the present invention.

What is claimed is:

1. A light-reflecting device for a photographic light, comprising a positioning member which is engageable with a support member, a top end of the support member being provided with a jacket; wherein the positioning member is provided with a locking mechanism of the jacket, the locking mechanism being provided with a movable lock button, the lock button being movably connected to the jacket, wherein the locking mechanism comprises the lock button, a toggle for controlling forward and backward movements of the lock button is provided at an upper end of the lock button, a rib movably connected to the jacket is provided on one side at a lower end of the lock button, and a reset member is provided on the other side at the lower end of the lock button, wherein the jacket comprises a jacket body allowing the support member to insert and a rotary shaft arranged passing through the jacket body, an end part of the jacket body is provided with a first bevel face.

2. The light-reflecting device for a photographic light according to claim 1, wherein the locking mechanism is arranged in a square groove, a positioning mechanism is arranged on one side of the rib, the height of the rib is higher than the jacket, and the rib and the jacket form an up-down staggered structure or mutually-nested structure.

3. The light-reflecting device for a photographic light according to claim 1, wherein the rib is a hollow tube structure or a hollow square structure or a hollow bar structure.

4. The light-reflecting device for a photographic light according to claim 1, wherein one side face of the rib movably connected to the jacket is provided with a second bevel face having an arch shape, the second bevel face structure in reverse to the first bevel face structure in terms of bevel direction, and, when the jacket rotates to be propped up, the first bevel face presses against the second bevel face constantly to push the lock button to move inwards.

5. The light-reflecting device for a photographic light according to claim 1, wherein the locking mechanism comprises a lock button, a rotating shaft used for moveably connecting the lock button to the positioning member, and an elastic element, the elastic element being arranged on the rotating shaft, one end of the elastic element abutting against the positioning member while the other end abutting against the lock button, and a hook part having an arch shape structure being formed on the lock button.

6. The light-reflecting device for a photographic light according to claim 5, wherein a limiting groove is formed on the positioning member, the jacket comprises a second jacket body allowing the support member to insert and a second rotary shaft arranged crossing the second jacket body, and, when the second jacket body rotates to be propped up, the lock button turns over around the rotary shaft under the action of the restoring force of the elastic element, the hook part can limit the second jacket body penetrating out from one side of the limiting groove.

7. The light-reflecting device for a photographic light according to claim 5, wherein the elastic element is a torsional spring.

8. The light-reflecting device for a photographic light according to claim 1, wherein the positioning member is provided with a cover body, both the positioning member and the cover body are of hollow structure.

9. The light-reflecting device for a photographic light according to claim 8, wherein annular hollows of the positioning member and the cover body are each provided with a flashlight.

10. The light-reflecting device for a photographic light according to claim 1, wherein a reflecting cloth is arranged between two neighboring support members.

* * * * *